(12) United States Patent
Menezes et al.

(10) Patent No.: US 8,209,162 B2
(45) Date of Patent: Jun. 26, 2012

(54) MACHINE TRANSLATION SPLIT BETWEEN FRONT END AND BACK END PROCESSORS

(75) Inventors: Arul A. Menezes, Bellevue, WA (US); Christopher B. Quirk, Seattle, WA (US); Richard F. Rashid, Redmond, WA (US); Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1462 days.

(21) Appl. No.: 11/414,844

(22) Filed: May 1, 2006

(65) Prior Publication Data
US 2007/0255550 A1 Nov. 1, 2007

(51) Int. Cl.
  *G06F 17/28* (2006.01)
  *G06F 17/21* (2006.01)
(52) U.S. Cl. .............. 704/2; 704/3; 704/4; 704/10
(58) Field of Classification Search ............ 704/2–8, 704/10
  See application file for complete search history.

(56) References Cited

U.S. PATENT DOCUMENTS

| 6,151,688 A * | 11/2000 | Wipfel et al. ............ 714/48 |
| 6,282,508 B1 * | 8/2001 | Kimura et al. ............ 704/10 |
| 6,292,769 B1 * | 9/2001 | Flanagan et al. ............ 704/3 |
| 6,789,057 B1 * | 9/2004 | Morimoto et al. ............ 704/2 |
| 2001/0018649 A1 * | 8/2001 | Kasai et al. ............ 704/3 |
| 2002/0177992 A1 * | 11/2002 | Andrews et al. ............ 704/5 |
| 2003/0212542 A1 * | 11/2003 | Lee et al. ............ 704/7 |
| 2003/0225569 A1 * | 12/2003 | Shimamura ............ 704/2 |
| 2004/0102957 A1 * | 5/2004 | Levin ............ 704/3 |
| 2004/0167768 A1 * | 8/2004 | Travieso et al. ............ 704/2 |

OTHER PUBLICATIONS

Chris Quirk, Arul Menezes and Colin Cherry, "Dependency Treelet Translation: Syntactically Informed Phrasal SMT," Jun. 2005, pp. 271-279.
Franz Joseph Och and Hermann Ney, "Discriminative Training and Maximum Entropy Models for Statistical Machine Translation," Jul. 2002, 8 pages.
Philipp Koehn, "Pharaoh: A Beam Search Decoder for Phrase-Based Statistical Machine Translation Models," 2004, 10 pages.

* cited by examiner

*Primary Examiner* — Jialong He
(74) *Attorney, Agent, or Firm* — Westman, Champlin & Kelly, P.A.

(57) ABSTRACT

A method of translation includes uploading a source text portion to a back end processor. The back end processor identifies a subset of translation knowledge associated with the source text portion. The back end processor downloads the subset to a front end processor. A translation engine runs on the front end processor. The translation engine generates a translation of the source text portion as a function of the subset.

19 Claims, 7 Drawing Sheets

MACHINE TRANSLATION SPLIT BETWEEN FRONT END AND BACK END PROCESSORS

BACKGROUND

Machine translation performed by a internet service provider as a web service is known. Even with the use of a simple rule-based translation engine, translation processes require a very large number of computations being performed by the internet service provider's server. Availability of the internet service provider's server for other users and other services is severely limited while a translation is being performed.

Modern data-driven machine translation technology (particularly statistical machine translation technology) can provide much higher quality translation than legacy rule-based systems, but is far too computationally intensive to be performed on the internet service provider's server according to current web-service models.

One rule-of-thumb for web services is that any computation process that requires more than 50 milliseconds of server CPU (central processor unit) time is too expensive to be used to respond to a web-service request. Using current methods on current processors, translating a single page of text takes on the order of 5,000 milliseconds of CPU time.

Methods and apparatus are needed to provide rapid machine translation over a network without excessive use of CPU time by a service provider's server.

The discussion above is merely provided for general background information and is not intended to be used as an aid in determining the scope of the claimed subject matter.

SUMMARY

Disclosed is a method of translation. The method of translation comprises uploading a source text portion to a back end processor. The back end processor identifies a subset of translation knowledge associated with the source text portion. The back end processor downloads the subset to a front end processor.

The method of translation comprises running a translation engine on the front end processor. The translation engine generates a translation of the source text portion as a function of the subset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

In the embodiments described below, a method of translation comprises uploading a source text portion to a back end processor. The back end processor identifies a subset of translation knowledge associated with the source text portion. The back end processor downloads the subset to a front end processor. A translation engine runs on the front end processor. The translation engine generates a translation of the source text portion as a function of the subset.

The task of translation is off-loaded to the front end processor, which frees up processing time on the back end processor. The back end processor is available for processing to other front end processors that are connected to the back end processor. The availability of processing time on the back end processor is enhanced by off-loading translation tasks to the front end processor.

Figure 1:
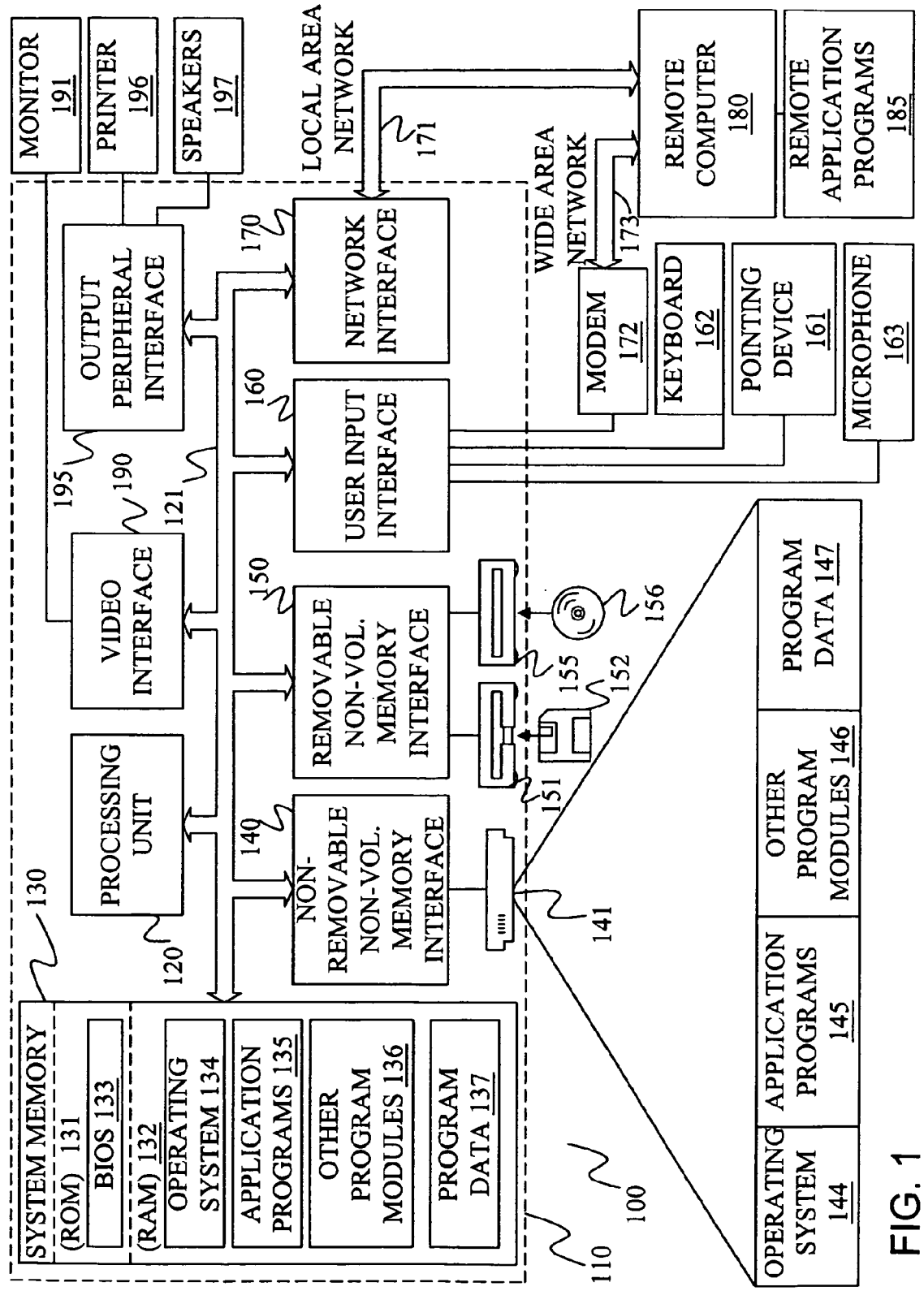
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
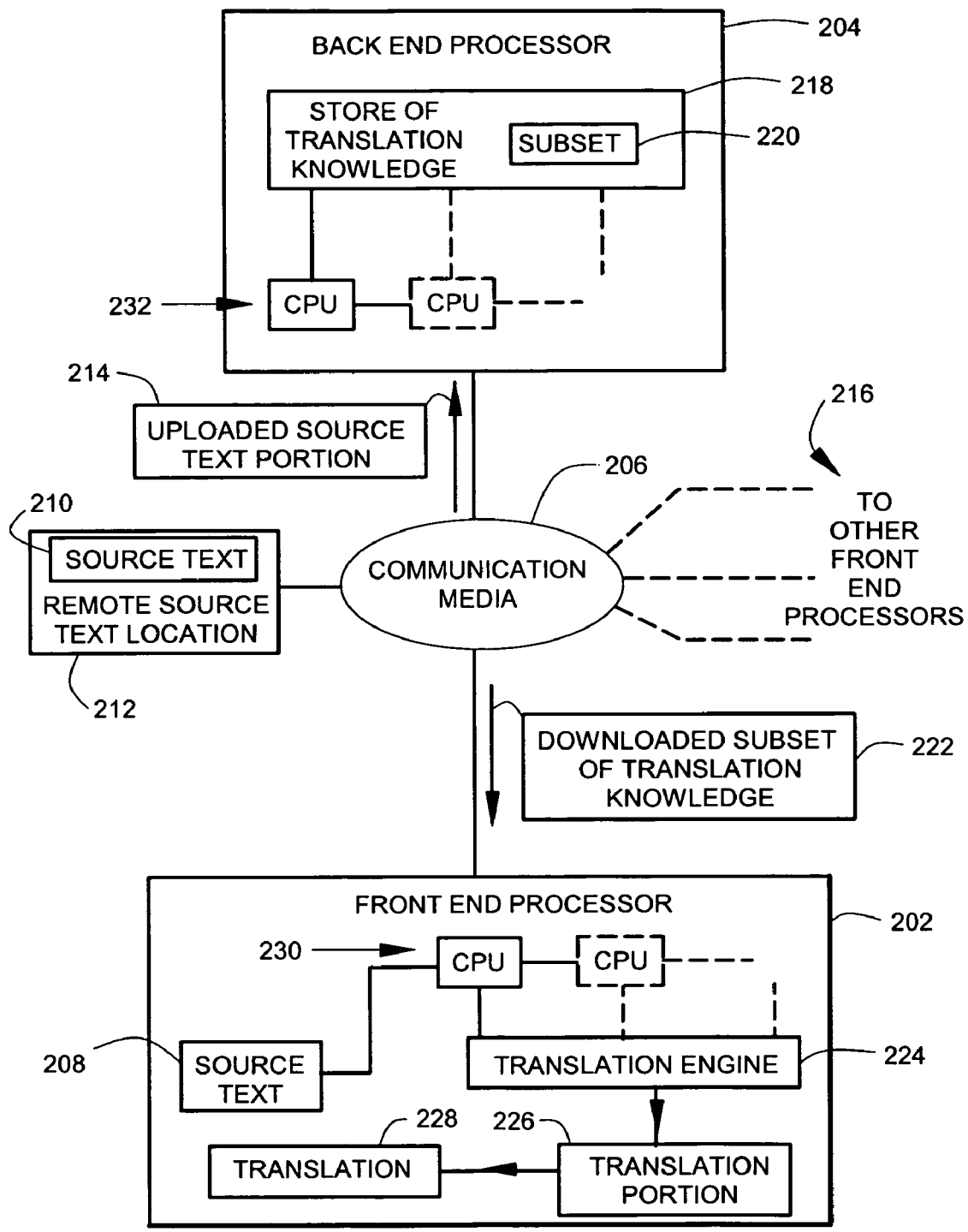
FIG. 2 illustrates a block diagram of a front end processor and a back end processor performing a machine translation.

FIG. 2 illustrates a block diagram of a front end processor 202 and a back end processor 204 connected via communication media 206 for performing a machine translation method. Translation can be performed on a source text 208 that is stored on the front end processor 202. Alternatively, translation can be performed on a source text 210 that is stored at a remote source text location 212 that is also coupled to communication media 206. In the description that follows, the source text 208 is used as an example. It is to be understood that the description below of processing source text 208 is alternatively applicable to processing the source text 210.

The source text 208 can be any source text that includes translatable text. The source text 208 can be a word processor file, a page composition file, an HTML web page, or other file that includes text as well as various kinds of formatting that are not translatable. The source text 208 can alternatively be converted text (as explained in more detail below in connection with FIG. 6) that has untranslatable formatting removed and that includes only text that is potentially translatable.

In one embodiment, the front end processor 202 divides the source text 208 into one or more uploaded source text portions such as exemplary source text portion 214. Alternatively, the back end processor 204 can divide up the source text 208. The process of dividing limits the size of the individual source text portions, allowing processes of communication over the communication media 206, processing in the back end processor 204 and processing in the front end processor 202 to go forward simultaneously on different source text portions. The limited size of the source text portions uploaded from the front end processor 202 to the back end processor 204 over the communication media allows for shared or interleaved use of communication media 206 in downloading to front end processor 202 and in both uploading and downloading with other front end processors 216.

It may be that the smallest text segment that the front end processor 202 is able to identify as independently translatable is larger than the ideal size for balancing communication overhead and latency. For example, there can be a source text with several pages containing no paragraph breaks in a language for which there is no sentence breaking function available on the front end processor. In a case like this, the back end processor 204 can download translation knowledge packages and source text analyses for a sequence of smaller segments rather than the entire segment the client uploads.

A store of translation and text analysis knowledge 218 is stored on the back end processor 204. The store of translation knowledge 218 includes information that relates words or combinations of words in a first (source) language to corresponding words or combinations of words in a second (target) language; as well information concerning the ordering of words or combinations of words in the target language, either dependent on, or independent of, the corresponding source language words or combinations of words. The analysis of the source text is described in detail below in connection with FIG. 5. After the source text portion 214 (in a first language) is uploaded to the back end processor 204, the back end processor 204 identifies a subset 220 of translation knowledge and text analysis associated with the source text portion. The subset 220 is specific to the words or combinations of words of the first language that appear in the source text portion 214 and to corresponding words or combinations of words in the second (target) language. The subset 220 is downloaded as a downloaded subset 222 to the front end processor 202. The back end processor 204 identifies the subset 220; however, the back end processor 204 does not perform a translation using the subset 220. The task of translation is off-loaded to the front end processor 202, which frees up processing time on the back end processor 204. The back end processor 204 is available for processing by the other front end processors 216. The availability of processing time on the back end processor 204 is enhanced by off-loading translation tasks to the front end processor 202.

The front end processor 202 runs a translation engine 224. The translation engine 224 generates a translation portion 226 of the source text portion 214 as a function of the subset 220. The translation engine 224 can be any know type of translation engine, such as rule based, data driven or statistical translation engines.

After completion of all translation for the source text 208, multiple translation portions 226 are assembled into a complete translation 228. The time intensive task of performing the translation is performed on the front end processor 202 so that the back end processor 204 is not overloaded with translation engine processing.

In one embodiment, a first number N1 of instructions are processed in the translation engine for the source text portion M; and a second number N2 of instructions are processed in the back end processor for identifying a subset for the source text portion M. The first number N1 is at least 10 times the second number N2, providing an uneven split of front and back end processor instruction processing times that leverages the back end processor for multiple tasks.

The process of identifying a subset 220 comprises a relatively simple task requiring relatively few instructions in order to limit the subset 220 to information concerning only the words or combinations of words potentially needed to translate the source text portion. The process of translation in the translation engine 224 is a relatively complex task that requires many more instructions to be processed; however this large number of instructions is processed in the front end processor 202.

In one embodiment, the back end processor 204 comprises a web service provider's server, the front end processor 202 comprises a web service user's client, and the communication media includes communication over the internet. The web service provider is able to provide on-line translation to a client without incurring excessive back end processor processing time and without excessive use of bandwidth on the communication media 206.

In another embodiment, the back end processor 204 comprises a web service provider's server, the front end processor 202 comprises a user's client, and the communication media comprises a wide area network (WAN).

In another embodiment, the back end processor 204 comprises a user's server, the front end processor 202 comprises a user's personal computer and the communication media comprises a local area network (LAN) or a wide area network (WAN).

In yet other embodiments, the back end processor 204 and the front end processor 202 are both servers, providing a web-base translation service or other high-volume translation service. Other known configurations of back end processors, front end processors and communication media are also contemplated, applying to any situation in which it is desirable to centralize the storage of translation knowledge, but distribute the load of translation processing.

The back end processor 204 can comprise a single computer, or multiple computers in a computing cluster. The back end processor 204 can include one or more central processing units (CPUs) 232. In the case of a computing cluster, the translation knowledge may be fully replicated on each individual device, or divided into subsets across the collection of devices, or divided into subsets with replication of the subsets.

The front end processor 202 can comprise a single processor or multiple processors in a computing cluster. The front end processor 202 can include one or more central processing units (CPUs) 230.

The translation engine 224 does not require access to the back end processor 204 during translation of a source text portion. The translation engine 224 can thus translate a source text portion without tying up resources of the communication media 206 and the back end processor 204. In one embodiment, source text 208 is divided up into multiple source text portions in the front end processor 202, offloading that task from the back end processor 204.

Timing of activities in FIG. 2 is described below in connection with an example shown in FIG. 3.

Figure 3:
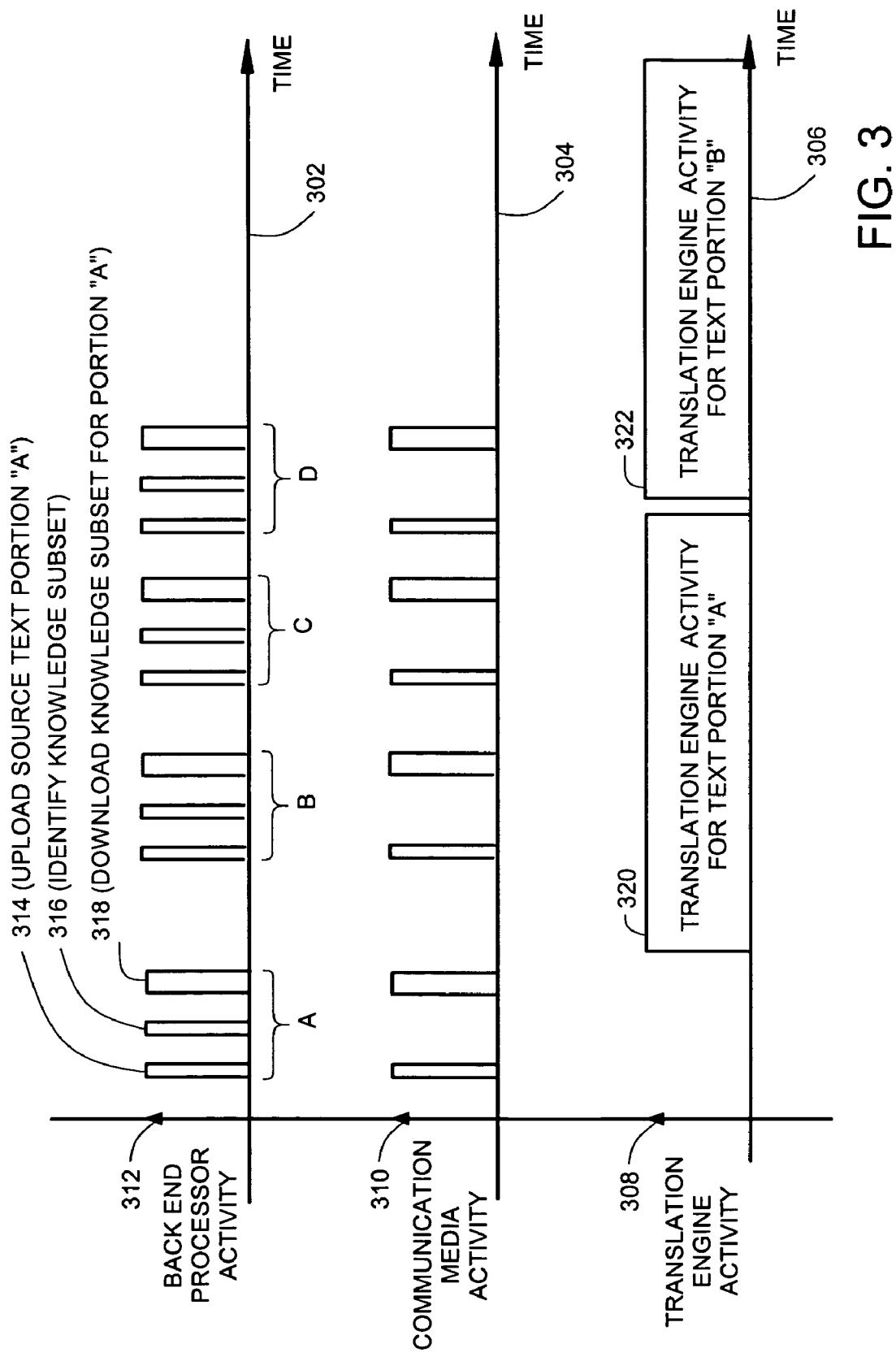
FIG. 3 illustrates an exemplary timing diagram of translation activity on a translation engine running on a front end processor, and identifying activity on a back end processor identifying subsets of translation knowledge.

FIG. 3 illustrates an exemplary timing diagram of activity on a translation engine running on a front end processor, and activity on a back end processor identifying subsets of translation knowledge. The horizontal axes 302, 304, 306 represent time. The vertical axis 308 represents activity of the translation engine. The vertical axis 310 represents communication activity on the communication media. The vertical axis 312 represents activity on the back end processor.

Activity begins with uploading a source text portion A at 314, identifying a translation knowledge subset for source text portion A at 316, and downloading the translation knowledge subset at 318. After receiving the downloaded translation knowledge subset for source text portion A, there is translation engine activity at 320 in translating the source text portion A. As illustrated, the translation engine activity for source text portion A requires a much longer processing time than the processing time needed for identifying a knowledge subset for source text portion A. While the translation engine is still active translating the source text portion A, the back end processor simultaneously completes the upload, identifying and downloading activities associated with source text portions B and C. After completion of translation of source text portion A, the translation engine continues on to begin the translation of source text portion B at 322 while the back end processor is simultaneously processing on source text segment D.

Processes performed in FIGS. 2-3 are described below in an example illustrated in FIG. 4.

Figure 4:
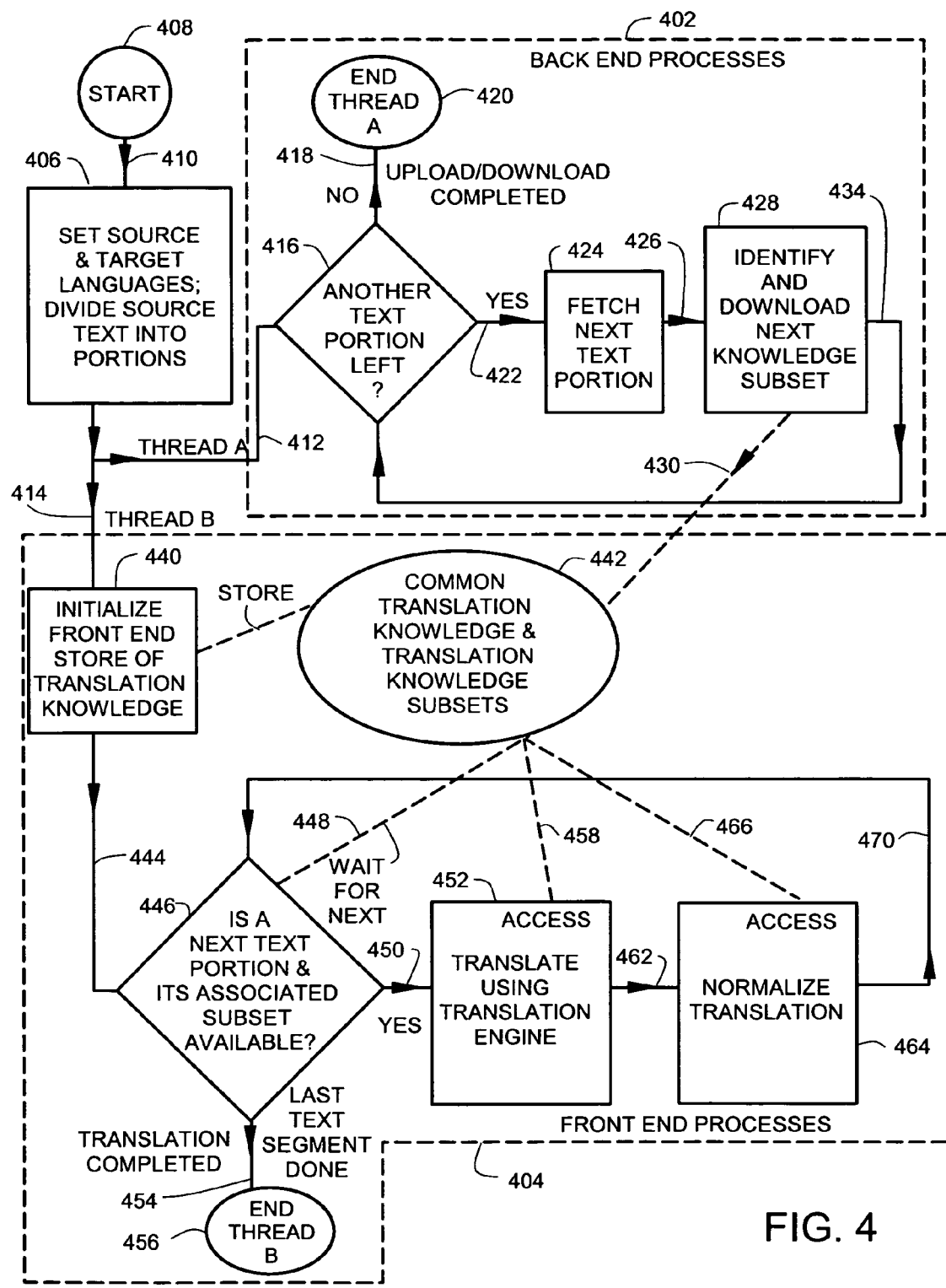
FIG. 4 illustrates a flow chart of front end and back end processor processes in performing a machine translation.

FIG. 4 illustrates a flow chart of front end and back end processes in performing a machine translation. Processes that are performed by a back end processor are shown in block 402. Processes that are performed in a front end processor are shown in block 404. A process 406 of setting source and target languages is an initialization process that is communicated to both the front end and back end processes. The process 406 also divides the source text into text portions. When the source text originates in a location other than the back end processor 402, then process 406 also uploads the source text to the back end processor 402. Division of source text and source text analysis are described in more detail below in connection with an illustrative example 550 described below in connection with FIG. 5.

Processing begins at start 408 and continues along line 410 to process block 406. At process block 406, the source and target languages for the translation of a document are set. In some cases, a user will be able to identify and select a source language from the user's knowledge of the source to be translated. In other cases, the user does not know the source language, and the source language is automatically identified. Language identification by statistical analysis of a text is a known technology. One commonly used technique is to identify the language by the probability of overlapping three character sequences, using what is called a "character trigram language model." The user selects the target language, or a default target language can be specified based on a default language of the front end processor operating system software, or other criteria.

After the source and target languages are identified, then processing continues simultaneously along two separate threads A and B. Thread A continues along line 412 to back end processes 402. Thread B continues along line 414 to front end processes 404. Thread A and thread B processes can execute simultaneously, with thread B processes being limited by potentially waiting for caching of required data from thread A.

Processing continues from line 412 to decision block 416. Decision block 416 tests whether there is a next source text portion left to be processed by the back end processor. If all source text portions for the current source text have already been processed by the back end processor, then processing continues along line 418 to end thread A at 420. If a next source text portion is left for processing, then processing continues along line 422 to action block 424.

At action block 424, the next source text portion is fetched (or uploaded, if needed) to the back end processor, and processing continues along line 426 to action block 428. At action block 428, the translation knowledge subset and text analysis for the source text portion is identified, and downloaded along line 430 to translation knowledge store 442. Action block 428 is described by way of an illustrative example block 552 in FIG. 5. Translation knowledge store 442 is in the front end processor. The block 428 preferably keeps a record of what is already downloaded to knowledge store 442 so that duplicate downloads of the same knowledge can be avoided. After completion of action block 428, processing continues along line 434 back to decision block 416. The process continues iteratively until there is no source text portion left to process, and then processing continues along line 418 to end thread A at 420. The back end process 402 (thread A) for a particular source text are typically completed before the front end processes (thread B) are completed.

Turning now to thread B, processing continues along line 414 to action block 440. At action block 440, the front end store of translation knowledge 442 is initialized. In some embodiments, this comprises loading a static set of common translation knowledge 442 into the store 442. In one embodiment, the static set of common knowledge comprises translation data specific to the source-target languages identified at action block 406, but not specific to the content of the source text. In another embodiment, the static set of common knowledge comprises translation data specific to a source text context specified by a user. The user can specify a context such as social, political, scientific, etc. for adjusting the operation of the translation engine according to context. It will be understood by those skilled in the art that other common translation knowledge can be stored as well. After completion of action block 440, processing continues along line 444 to decision block 446.

At decision block 446, testing is done to ascertain whether a next text portion and its associated translation knowledge subset (in store 442) are both available. If both are not available, then there is a wait (as indicated by dashed line 448) until a translation knowledge subset is available for the current text portion. When both the text portion and its associated translation knowledge subset are available, the processing continues along line 450 to action block 452. When there is no further text portion to be translated, the processing continues along line 454 to end thread B at 456.

At action block 452, a translation engine translates the current text portion by accessing the store of translation knowledge 442 (indicated by dashed line 458). After completion of the translation at action block 452, processing continues along line 462 to action block 464.

At action block 464, the translation is normalized. Normalization processes include text polishing of punctuation and orthography in the target language. Normalization can include adding features such as contractions and eliding, adjusting diacritical marks, adjusting spaces before or after punctuation, and capitalization. The normalization is a function of the capabilities of the translation engine and the target languages, and thus can vary considerably from one translation to the next. After completion of the normalization at action block 464, processing continues along line 470 back to decision block 446 for beginning processing of the next text portion.

Figure 5:
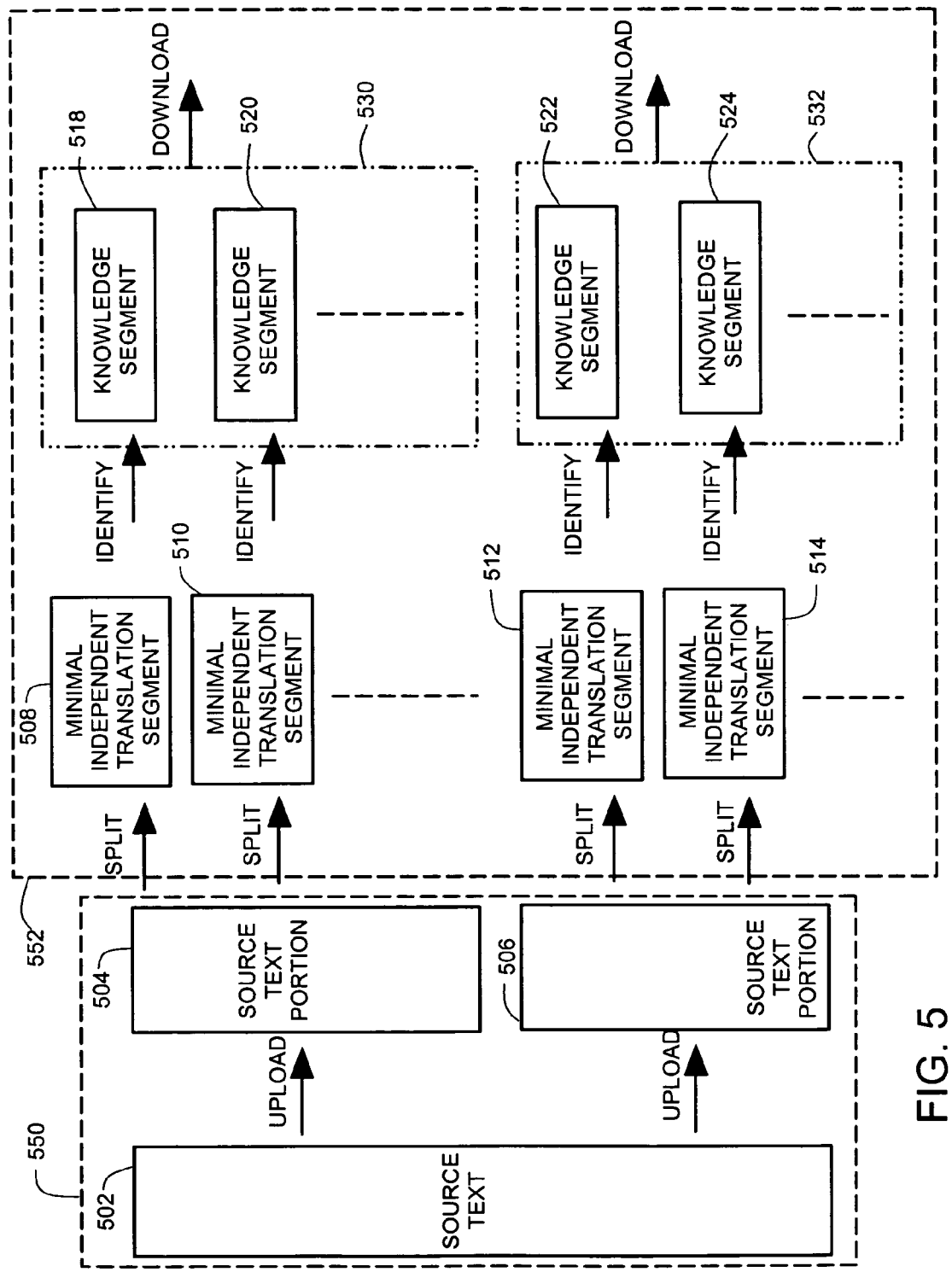
FIG. 5 illustrates a flow chart of splitting source text and downloading translation knowledge segments.

FIG. 5 illustrates a flow chart of dividing source text and downloading translation knowledge segments. A source text 502 is divided up into source text portions 504, 506 that are uploaded to a back end processor. The processes in a block 550 in FIG. 5 are exemplary of the division processes described above in connection with block 406 in FIG. 4. The source text portions 504, 506 are limited, if possible, to a specified pre-determined length. Breaks between source text portions typically are made at portion boundaries between paragraphs. A text portion must be identifiable as being independently translatable, without detailed translation knowledge. In some cases, the smallest text portion having this property may be longer than the desired pre-determined length. In this case, the text portion will be the smallest portion that can be identified as independently translatable.

The back end processor splits source text portion 504 into minimal independent translation segments (MITSs) 508, 510. The MITSs are the smallest segments that can be translated independently and sequentially, according to the detailed translation knowledge stored on the back end processor. What comprises the translation knowledge needed for a particular MITS depends on the nature of the translation knowledge used by a particular translation engine. In one embodiment, the translation engine may be a "phrase-based" statistical machine translation system. In such a system, the overwhelming bulk (in terms of bytes to be downloaded) of the translation knowledge consists of phrase translation pairs and their scores and target language word N-grams and their scores. In this case, the main translation knowledge for a particular MITS would comprise (1) all the phrase translation pairs in the main translation knowledge store whose source language side matches a substring occurring in the MITS and (2) all word N-grams occurring in the main translation knowledge store that can be constructed from the target language sides of the phrase translation pairs for the MITS while respecting the word order of those target language sides of the pairs. For example, to translate the English sentence "I don't understand" into French, we might expect to find the phrase translation pairs "I/je" and "don't understand/ne comprends pas" in the main translation knowledge store, along with the French trigrams "je ne comprends" and "ne comprends pas." We would include all of these, and their scores, in the translation knowledge package for a source text segment containing "I don't understand." However, we would not include French trigrams that are impossible to obtain without changing the order of, or interleaving, words from the French sides of the phrase translation pairs, such as "ne je comprends" or "comprends ne pas," unless they could be constructed out of the French sides of some additional required phrase translation pairs without violating their word order constraints.

In another embodiment, the translation engine comprises a "tree-to-string" statistical machine translation system. In this case, the type of translation knowledge required is similar to that of the phrase-based system, except that the translation pairs would be "dependency-treelet" pairs, and the word N-grams would also comprise those that could be formed by interleaving the target language sides of translation pairs.

What comprises the source text analysis needed for a particular MITS also depends on the nature of the translation knowledge used by a particular translation engine. For a basic phrase-based statistical machine translation system, simply dividing the MITS into words may be all that is required. For a more sophisticated phrase-based statistical machine translation system, some analysis of the words might also be performed. For example, if the source language were English, contractions might be expanded, so that "don't" becomes "do not", etc. For a tree-to-string statistical machine translation system, the source text analysis might also include a dependency parse of the source text MITS.

The back end processor splits source text portion 506 into minimal independent translation segments 512, 514. It will be understood that the number of source text portions can be one, two or a larger number based on the length of the source text.

It will be understood that the number of minimal independent translation segments can be one, two or a larger number depending on the content of each source text portion. In one embodiment, the minimal independent translation segment corresponds with a phrase. In another embodiment, the minimal independent translation segment corresponds with a complete sentence. It is understood that other sizes of minimal independent translation segments can be defined depending on the nature of the translation engine.

For each minimal independent translation segment 508, 510, 512, 514, a corresponding knowledge segment (including text analysis) 518, 520, 522, 524 is identified by the back end processor. The knowledge segments 518, 520 are non-redundantly assembled or concatenated to form a subset of translation knowledge 530 that corresponds with the source text portion 504. If a particular piece of translation knowledge is already included in the translation knowledge subset, or previously downloaded for this translation task, it is not added again. The subset of translation knowledge 530 is downloaded to a front end processor for subsequent use by a translation engine.

The knowledge segments 522, 524 are assembled or concatenated to form a subset of translation knowledge 532 that corresponds to the source text portion 506. The subset of translation knowledge 532 is downloaded to a front end processor for subsequent use by a translation engine.

The processes described in FIG. 2-5 can be combined with front end and back end processes as described below in examples illustrated in FIGS. 6-7. The processes included in a block 552 in FIG. 5 are exemplary of the division processes described above in connection with block 428 in FIG. 4.

It will be understood that the process of splitting or dividing the source text can take place on a front end processor, a back end processor or at a remote location. Typically the splitting or dividing of the source text takes place on the processor where the source text is originally located, however, may take place on a different processor depending on user preference or the availability of processing resources for the text splitting process.

Figure 6:
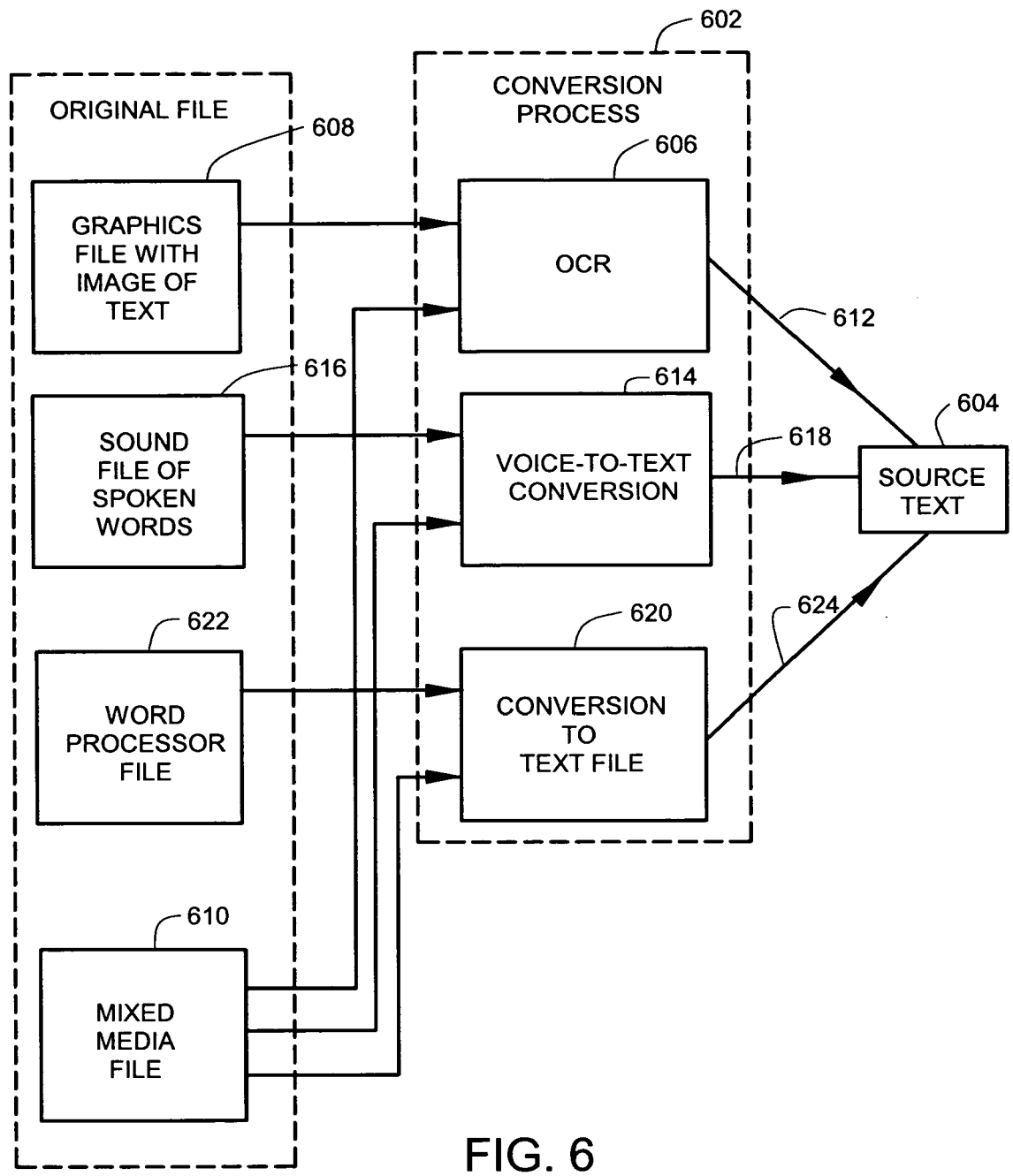
FIG. 6 illustrates a block diagram of forming a source text.

FIG. 6 illustrates a block diagram of forming a source text. The translation embodiments described above in connection with FIGS. 2-5 can be arranged to process a source text which is in a word processor format, an html format, an xml format or other format that includes unformatted text as well as non-translatable formatting that is applied to the text. Alternatively, various input filters can be used to remove formatting, or to take media which is not in any text format and convert it to a text format. Formatting that is removed can include fonts, styles, dingbats, non-text graphic images, margins, hidden features, and the like. In FIG. 6, an example of a conversion process 602 is shown that converts source media in a variety of formats to a source text 604 that includes only text and is free of non-translatable formatting.

The conversion process 602 includes a first input filter 606 which can receive a graphics file 608 or graphics that are part of a mixed media file 610. The first input filter 606 performs optical character recognition (OCR) on the received graphics file and provides an unformatted text output 612 to the source text file 604.

The conversion process 602 includes a second input filter 614 which can receive a sound file 616 or audio segments that are part of a mixed media file 610. The second input filter 614 performs voice-to-text conversion on the received sound or audio file and provides an unformatted text output 618 to the source text file 604.

The conversion process 602 includes a third input filter 620 which can receive a word processor file 622 or formatted text segments that are part of the mixed media file 610. The third input filter 620 removes non-translatable formatting and provides an unformatted text output 624 to the source text file 604.

All or part of the conversion process 602 can be added as a front end filter to provide a source text file 604 that is reduced in size and takes less time to upload. In one preferred embodiment, the conversion process 602 includes spell checking.

Figure 7:
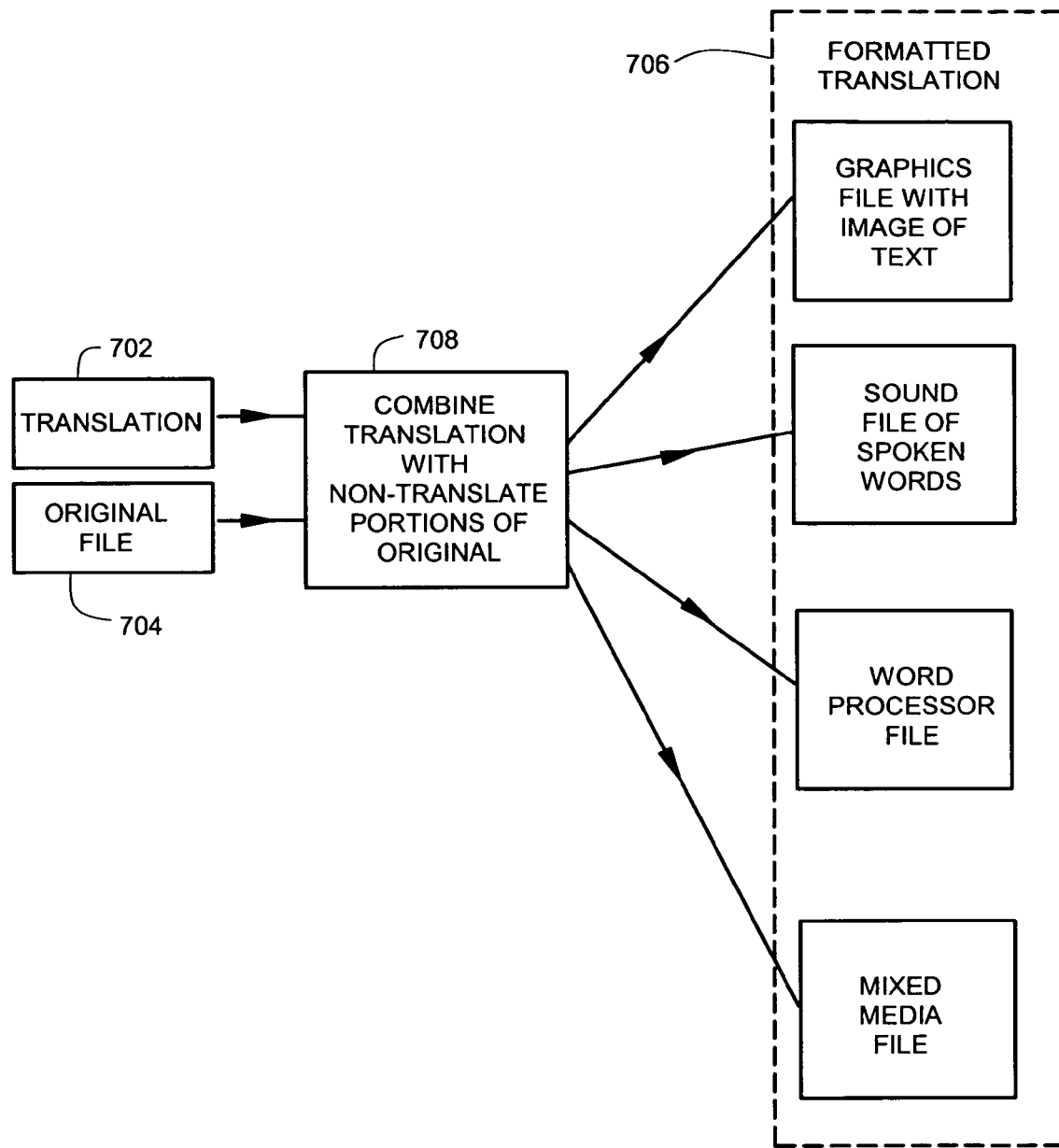
FIG. 7 illustrates a block diagram of forming a formatted translation.

FIG. 7 illustrates a block diagram of forming a formatted translation. A translation 702 is combined with its corresponding original file 704 to form a formatted translation. A combining process 708 takes the original file 704 (such as file 608, 616, 622 or 610 in FIG. 6) and replaces each segment of translatable source language in the original file with a corresponding segment of target language taken from the translation. The combining process restores, to the extent possible, the original formatting in the translation. In some embodiments, the output format is user selectable. An original sound file can be output as word processor file. An input HTML-formatted page in the source language can be output as an XML-formatted page (with XML formats corresponding to equivalent HTML formats) in the target language. An original word processor file can be output as a translated sound file.

All or part of the combining process 708 can be added as a post translation filter to provide a translated, formatted output file 706 desired by the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of translation, comprising:
    uploading a source text portion to be translated to a back end processor that identifies a subset of translation knowledge specifically associated with the uploaded source text portion and downloading the subset; and
    running a translation engine on a processor other than the back end processor to generate a translation of the source text portion as a function of the subset,
    wherein uploading the source text portion to the back end processor, which identifies the subset of translation knowledge specifically associated with the source text portion, is carried out prior to any attempt to translate the source text portion on the processor other than the back end processor, and
    wherein the back end processor splits the source text portion into minimal independent translation segments, and wherein the back end processor identifies, for each minimal independent translation segment of the minimal independent translation segments, a corresponding knowledge segment, and wherein the back end processor assembles the identified knowledge segments corresponding to respective ones of the minimal independent translation segments to form the subset of translation knowledge.

2. The method of claim 1 further comprising:
    processing a first number of instructions in the translation engine for the source text portion;
    processing a second number of instructions in the back end processor for the source text portion,
    wherein the first number is greater than the second number, providing an uneven split of back end processor instruction processing times and processing times on a processor other than the back end processor, the uneven split leveraging the back end processor for multiple tasks.

3. The method of claim 1 wherein the identifying comprises limiting the subset to a limited number of words and phrases potentially in the source text portion.

4. The method of claim 1 wherein the back end processor comprises a web service provider.

5. The method of claim 1 wherein the back end processor comprises a computing cluster.

6. The method of claim 1 wherein the translation engine does not access the back end processor during translation of a source text portion.

7. The method of claim 1 further comprising:
    dividing a source text into multiple source text portions and providing the multiple source text portions to the back end processor.

8. The method of claim 1 further comprising:
    converting an original file that includes non-translatable features to a source file from which the non-translatable features are removed.

9. The method of claim 8 further comprising:
    combining a translation with the non-translatable features to provide a translation that includes the non-translatable features.

10. A computer storage medium having computer executable components, comprising:
    a fetch component that fetches a source text portion to be translated to a back end processor, which identifies a subset of translation knowledge specifically associated with the fetched source text portion;
    a download component that downloads the subset of translation knowledge associated with the source text portion; and
    a translation engine on a processor other than the back end processor that generates a translation of the source text portion depending wholly or in part on the translation knowledge subset,
    wherein the fetch component fetches the source text portion to the back end processor, which identifies the subset of translation knowledge specifically associated with the source text portion, prior to any attempt to translate the source text portion on the processor other than the back end processor, and
    wherein the back end processor splits the source text portion into minimal independent translation segments, and wherein the back end processor identifies, for each minimal independent translation segment of the minimal independent translation segments, a corresponding knowledge segment, and wherein the back end processor assembles the identified knowledge segments corresponding to respective ones of the minimal independent translation segments to form the subset of translation knowledge.

11. The medium of claim 10 wherein:
    the translation engine processes a first number of instructions for the source text portion;

the back end processor processes a second number of instructions for the source text portion, and wherein the first number is greater than the second number, providing an uneven split of processor instruction processing times that leverages the back end processor for multiple tasks.

12. The medium of claim 10 wherein the translation engine does not access the back end processor during translation of a source text portion.

13. The medium of claim 10 further comprising:
a component that divides a source text into multiple source text portions in the front end processor and uploads the multiple source text portions to the back end processor.

14. The medium of claim 10 further comprising:
a component that converts an original file that includes non-translatable features to a source file from which the non-translatable features are removed.

15. The medium of claim 14 further comprising:
a component that combines the translation with the non-translatable features to provide a translation that includes the non-translatable features.

16. A method comprising:
dividing, based on a specified pre-determined length, a source text to be translated into multiple source text portions;
uploading each respective one of the multiple source text portions to a back end processor before any attempt is made to translate the corresponding respective one of the multiple source text portions;
identifying, using the back end processor, a corresponding translation knowledge subset for each of the multiple source text portions;
downloading the corresponding translation knowledge subset for each of the multiple source text portions; and
running a translation engine on a processor other than the back end processor to generate a translation for each of the multiple source text portions as a function of the corresponding translation knowledge subset for each of the multiple source text portions,
wherein the back end processor splits each source text portion of the multiple source text portions into minimal independent translation segments, and wherein the back end processor identifies, for each minimal independent translation segment of the minimal independent translation segments, a corresponding knowledge segment, and wherein the back end processor assembles the identified knowledge segments corresponding to respective ones of the minimal independent translation segments to form the corresponding translation knowledge subset.

17. The method of claim 16 wherein the back end processor comprise a web service provider.

18. The method of claim 16 wherein the back end processor comprises a computing cluster.

19. The method of claim 16 wherein the translation engine does not access the back end processor during translation of the multiple source text portions.

* * * * *